United States Patent
Chang et al.

(10) Patent No.: US 7,728,938 B2
(45) Date of Patent: Jun. 1, 2010

(54) LIQUID CRYSTAL DISPLAY

(75) Inventors: Shuo-Feng Chang, Tao Yuan Shien (TW); Jiun-Chang Chiou, Tao Yuan Shien (TW); Adam Young, Tao Yuan Shien (TW)

(73) Assignee: AU Optronics Corporation, Hsin-Chu (TW)

( * ) Notice: Subject to any disclaimer, the term of this patent is extended or adjusted under 35 U.S.C. 154(b) by 617 days.

(21) Appl. No.: 11/585,850

(22) Filed: Oct. 25, 2006

(65) Prior Publication Data

US 2007/0222931 A1  Sep. 27, 2007

(30) Foreign Application Priority Data

Mar. 24, 2006  (TW) .............................. 95110397 A (51) Int. Cl.
*G02F 1/1337* (2006.01)
(52) U.S. Cl. ...................................................... 349/129
(58) Field of Classification Search ........................ None
See application file for complete search history.

(56) References Cited

U.S. PATENT DOCUMENTS

| 6,057,902 | A | 5/2000 | Angelopoulos et al. | |
| 6,141,077 | A | 10/2000 | Hirata et al. | |
| 6,285,431 | B2 * | 9/2001 | Lyu et al. | 349/143 |
| 6,532,054 | B2 | 3/2003 | Ohmuro et al. | |
| 6,710,837 | B1 * | 3/2004 | Song et al. | 349/143 |
| 6,937,311 | B2 | 8/2005 | Song et al. | |
| 7,098,978 | B2 * | 8/2006 | Chen et al. | 349/129 |
| 7,193,672 | B2 * | 3/2007 | Takeda et al. | 349/129 |
| 7,405,789 | B1 * | 7/2008 | Sasaki et al. | 349/129 |

| 2004/0165129 | A1 | 8/2004 | Okumura |

FOREIGN PATENT DOCUMENTS

| CN | 1564074 | 1/2005 |
| JP | 2000-137227 | 5/2000 |
| JP | 2002098967 | 4/2002 |
| JP | 2004-318077 | 11/2004 |
| JP | 2005-24711 | 1/2005 |
| JP | 2005284025 | 10/2005 |

OTHER PUBLICATIONS

English language translation of abstract and pertinent parts of JP 2005284025.

(Continued)

*Primary Examiner*—Sung H Pak
(74) *Attorney, Agent, or Firm*—Thomas, Kayden, Horstemeyer & Risley (57) ABSTRACT

Disclosed is a liquid crystal display mainly including a liquid crystal layer having negative dielectric anisotropy sandwiched between two substrates treated by vertical alignment process, and first and second domain regulators for regulating orientation of the liquid crystal layer such that the liquid crystal molecules are aligned obliquely when a voltage is applied, so that the orientation will include a plurality of first and second directions. The first directions are different from the second directions. Each pixel is provided with one of the first and second domain regulators in a manner that every two adjacent pixels or every two adjacent R pixels, two adjacent G pixels or two adjacent B pixels are provided with different domain regulators.

5 Claims, 7 Drawing Sheets

OTHER PUBLICATIONS

English language translation of abstract and pertinent parts of JP 2002098967.
English language translation of abstract of CN 1564074.
English language translation of abstract of JP 2005-24711 (published Jan. 27, 2005).
English language translation of abstract of JP 2004-318077 (published Nov. 11, 2004).
English language translation of abstract and pertinent parts of JP 2000-137227 (published May 16, 2000).

* cited by examiner

LIQUID CRYSTAL DISPLAY

RELATED APPLICATIONS

The present application is based on, and claims priority from, Taiwan Application Serial Number 95110397, filed Mar. 24, 2006, the disclosure of which is hereby incorporated by reference herein in its entirety.

FIELD OF THE INVENTION

The present invention relates to a liquid crystal display (LCD), and more particularly to a vertically-aligned (VA) LCD

BACKGROUND OF THE INVENTION

Vertically-aligned (VA) LCD is a mode using a negative liquid crystal material and vertical alignment film. When no voltage is applied, liquid crystal molecules are aligned in a vertical direction and black display appears. When a predetermined voltage is applied, the liquid crystal molecules are aligned in a horizontal direction and white display appears. Comparing to the twisted nematic (TN) LCD, the vertically-aligned (VA) LCD provides higher contrast, higher response speed, and excellent viewing angle characteristics for white display and black display. However, the VA LCD still has a critical drawback of a narrow viewing angle. This poses a problem that the application of the VA LCD is limited.

It is known that viewing angle performance of a VA LCD can be improved by setting the orientation of the liquid crystal molecules inside pixels to a plurality of mutually different directions. European Patent Publication Number 0884626-A2 discloses a multi-domain vertically aligned (MVA) LCD having domain regulators for regulating the orientation of a liquid crystal in which liquid crystal molecules are aligned obliquely when a voltage is applied so that the orientation will include a plurality of directions within each pixel.

Figure 1:
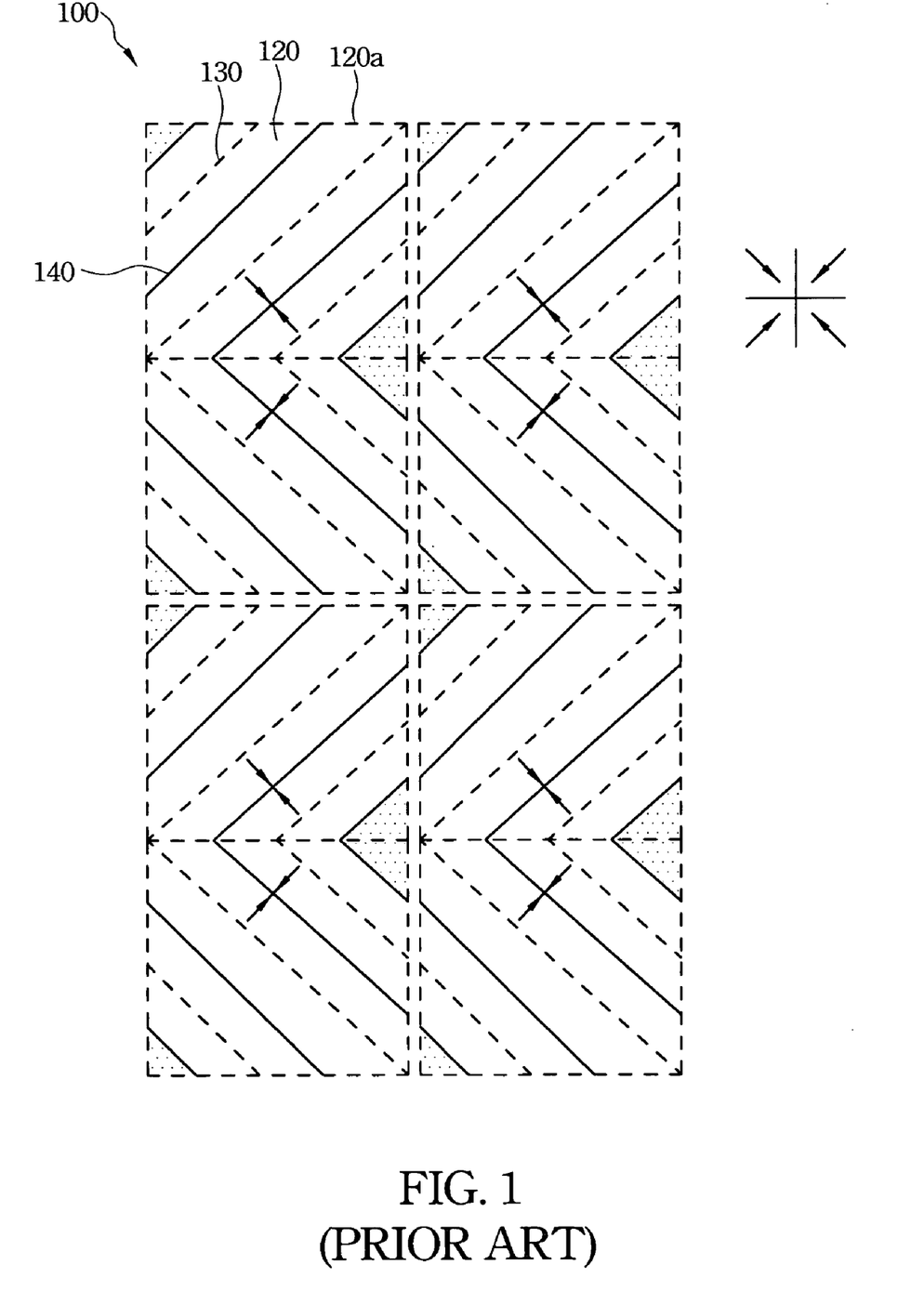
FIG. 1 shows a pixel layout of a conventional MVA LCD.

FIG. 1 shows a pixel layout of a conventional MVA LCD 100 illustrating four pixels thereof. As shown, as the domain regulators, pixel electrodes 120 on a TFT (Thin Film Transistor) substrate are provided with slits 130, and the common electrode on a CF (color filter) substrate is provided with protrusions 140. Note that the domain regulator is provided in each pixel. When a voltage is applied, electric fields oblique to the surfaces of the substrates are produced near the slits 130 and the edges 120a of the electrodes. The inclined surfaces of the protrusions 140 and the oblique electric fields generated between the substrates determine the directions of the liquid crystal molecules in which the liquid crystal molecules are tilted. In each of the pixels, the orientation of the liquid crystal is divided into four directions (as indicated by the arrows shown in FIG. 1) thereby improving viewing angle performance. In the LCD 100, disclination occurs at some particular regions within the pixel that appear darkened (darkened regions are hatched in FIG. 1).

Figure 2:
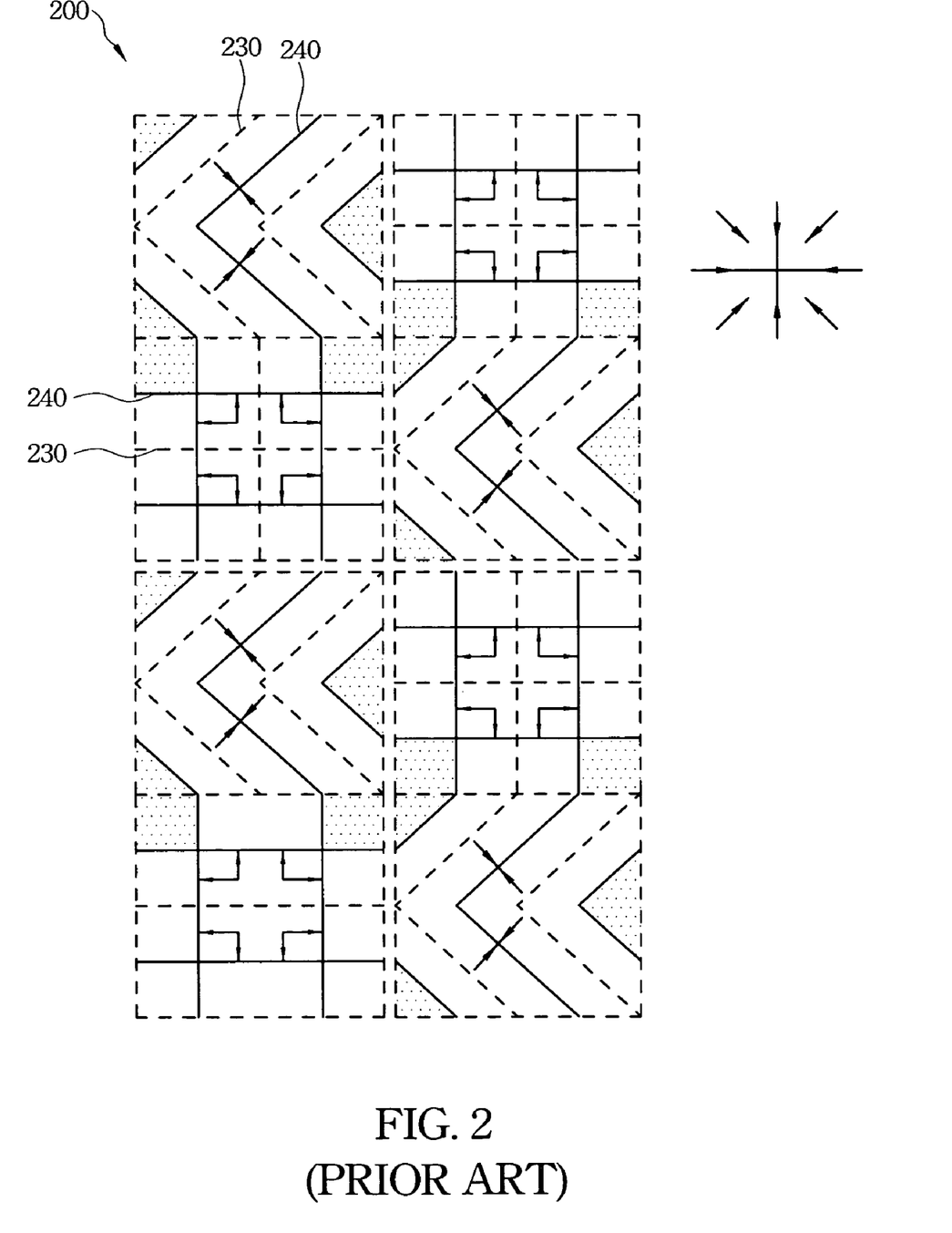
FIG. 2 shows a pixel layout of another conventional MVA LCD.

FIG. 2 shows a pixel layout of another conventional MVA LCD 200 illustrating four pixels thereof. As shown, a plurality of slits 230 and protrusions 240 are provided in a pixel for dividing the orientation of the liquid crystal into eight directions (as indicated by the arrows shown in FIG. 2) thereby improving viewing angle performance. In the LCD 200, disclination also occurs at some particular regions within the pixel that appear darkened (darkened regions are hatched in FIG. 2). Note that the total darkened regions in FIG. 2 substantially have twice the total area of the darkened regions in FIG. 1. Therefore, the LCD 200 has a better viewing angle performance but has a lower aperture ratio (i.e., the ratio of the area that can transmit light to the total pixel area).

It is apparently known from those described above that, the more directions into which the orientation of the liquid crystal is divided, generally the better the viewing angle performance can be, but the total area of the darkened regions are also significantly increased.

SUMMARY OF THE INVENTION

Therefore, it is an object of the present invention to provide an LCD having an improved viewing angle performance and a high aperture ratio.

An LCD for use in the present invention mainly includes a liquid crystal layer has a negative dielectric anisotropy sandwiched between two substrates treated by vertical alignment.

To achieve the above listed and other objects, an LCD according to one embodiment of the present invention is provided with first and second domain regulators respectively in two adjacent pixels or two adjacent pixels representing the same color such as two R pixels, two G pixels or two B pixels, wherein the first and second domain regulators regulate orientation of the liquid crystal layer such that the liquid crystal molecules are aligned obliquely when a voltage is applied, so that the orientation will include a plurality of first and second directions wherein the first directions are different from the second directions.

To achieve the above listed and other objects, an LCD according to another embodiment of the present invention is provided with first, second, third and fourth domain regulators respectively in four adjacent pixels or four adjacent pixels representing the same color such as four R pixels, four G pixels or four B pixels, wherein the first, second, third and fourth domain regulators regulate orientation of the liquid crystal layer such that the liquid crystal molecules are aligned obliquely when a voltage is applied, so that the orientation will include a plurality of first, second, third and fourth directions different from each other.

Through the specific arrangement of the domain regulators, the present invention can decrease the number of the oblique directions of the liquid crystal molecules in a single pixel to reduce the total area of the darkened regions thereby increasing the aperture ratio; meanwhile, an improved viewing angle performance is obtained by the different oblique directions provided by the liquid crystal molecules in the adjacent pixels. Therefore, an LCD utilizing the design of the present invention has an improved viewing angle performance and a high aperture ratio.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

While the present invention is susceptible of embodiment in various forms, there are presently preferred embodiments shown in the drawings and will hereinafter be described with the understanding that the present disclosure is to be considered as an exemplification of the invention and is not intended to limit the invention to the embodiments illustrated.

The LCD according to the present invention mainly comprises a first substrate and a second substrate. The surfaces of the substrates are treated by vertical alignment process, such as utilizing a vertical alignment film. A liquid crystal layer having negative dielectric constant anisotropy is sealed in between the two substrates. The liquid crystal layer includes liquid crystal molecules aligning in a direction generally perpendicular to a principal surface of the first substrate when no substantial electric field is applied to the liquid crystal layer.

In a VA LCD according to one embodiment of the present invention, the first and second domain regulators are respectively provided in two adjacent pixels or two adjacent pixels representing the same color such as two R pixels, two G pixels or two B pixels, wherein the first and second domain regulators regulate orientation of the liquid crystal layer such that the liquid crystal molecules are aligned obliquely when a voltage is applied, so that the orientation will include a plurality of first and second directions wherein the first directions are different from the second directions.

The VA LCD of the present invention is preferably a TFT (Thin Film Transistor) LCD. The first substrate may be provided with a plurality of gate lines (not shown) formed in parallel to each other, a plurality of data lines (not shown), vertically to the gate lines, formed in parallel to each other, and TFTs (not shown) and pixel electrodes formed like a matrix at intersections between the gate lines and data lines. The second substrate may be provided with a light-shielding matrix such as black matrix (BM) (not shown), a plurality of color filters (not shown) and a common electrode (not shown). The pixel mentioned above is a region where is surrounded by two adjacent gate lines, two adjacent data lines, and a corresponding color filter. Pixels having red, green and blue color filters represent red, green and blue colors and are defined as R pixels, G pixels and B pixels, respectively. Typically, the first substrate is referred to as a TFT substrate, while the second substrate is referred to as a color filter (CF) substrate because color filters are formed. Usually, spacers (not shown) are formed between the first substrate and the second substrate for defining the gap between the two substrates.

Figure 3A:
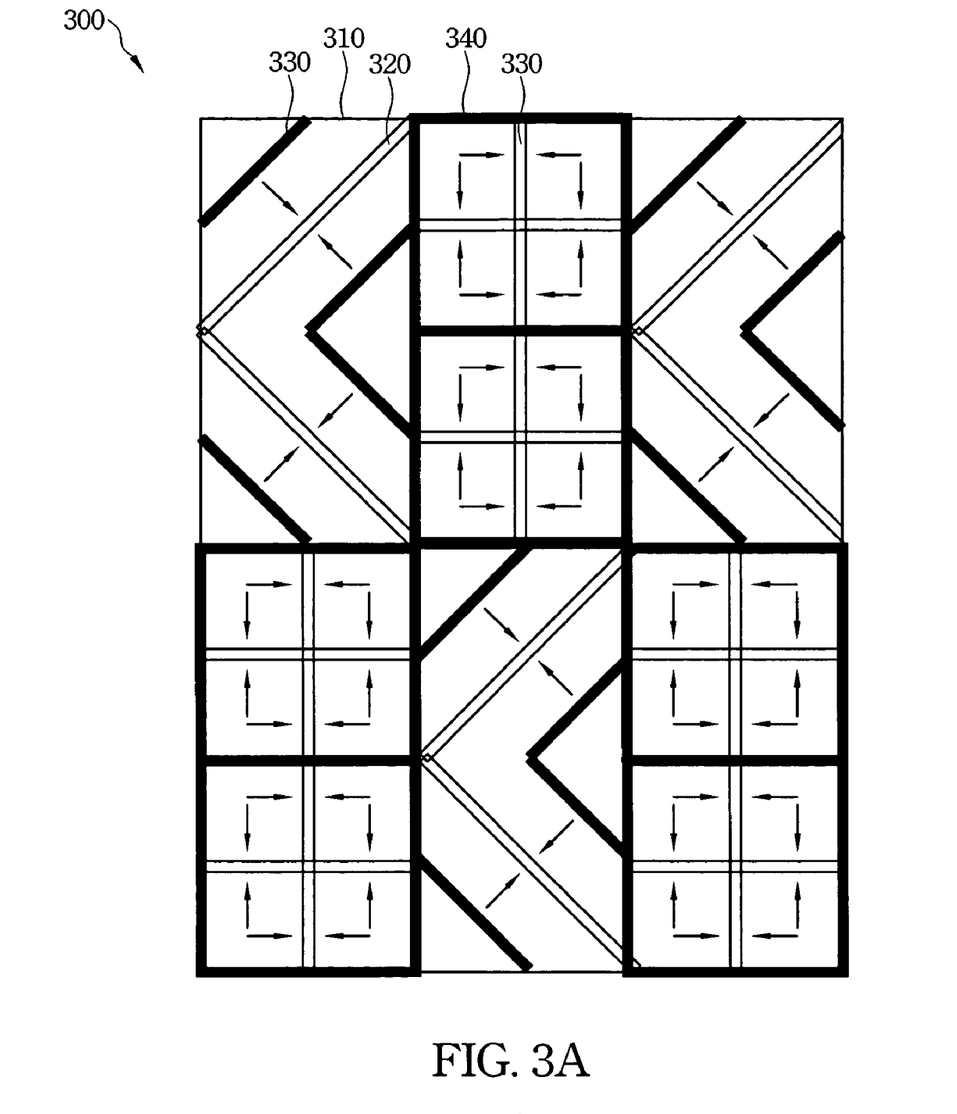
FIG. 3A shows a pixel layout of an LCD according to one embodiment of the present invention.

FIG. 3A shows a pixel layout of an LCD 300 according to one embodiment of the present invention illustrating six pixels thereof. In this embodiment, the first domain regulator includes a plurality of slits 320 arranged in a zigzag pattern on the pixel electrodes 310, and a plurality of protrusions 330 arranged in a zigzag pattern on the second substrate, wherein the slits and the protrusions are arranged alternately and in parallel to each other. The second domain regulator includes a plurality of cross-shaped slits 330 on the pixel electrodes, and a plurality of closed rectangular protrusions 340 around the cross-shaped slits 330 on the second substrate. The protrusions 340 are formed from dielectric material.

Figure 3B:
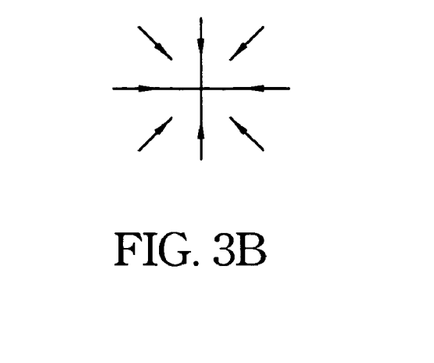
FIG. 3B illustrates the oblique directions of the liquid crystal molecules in the LCD of FIG. 3A.

It is understood that, although the orientation of the liquid crystal is divided into only four mutually different directions in each of the pixels (as indicated by the arrows shown in FIG. 3A), the oblique directions of the liquid crystal molecules in one pixel are different from those in adjacent pixels. Therefore, when an image or object is displayed by at least two adjacent pixels, the orientation of the liquid crystal can be regarded as including eight mutually different directions as indicated by the arrows shown in FIG. 3B, thereby obtaining an improved viewing angle performance as compared with the conventional LCD 100. Typically, an image is not so delicate that a large difference is observed between two adjacent pixels. Therefore, substantially no color-mixing problem or recognition-confusing problem is observed in the LCD of the present invention. The orientation of the liquid crystal in a single pixel of the LCD according to this embodiment is divided into only four mutually different directions such that, as compared with the conventional LCD 200, the total area of the darkened regions is significantly reduced thereby increasing the aperture ratio.

Figure 4:
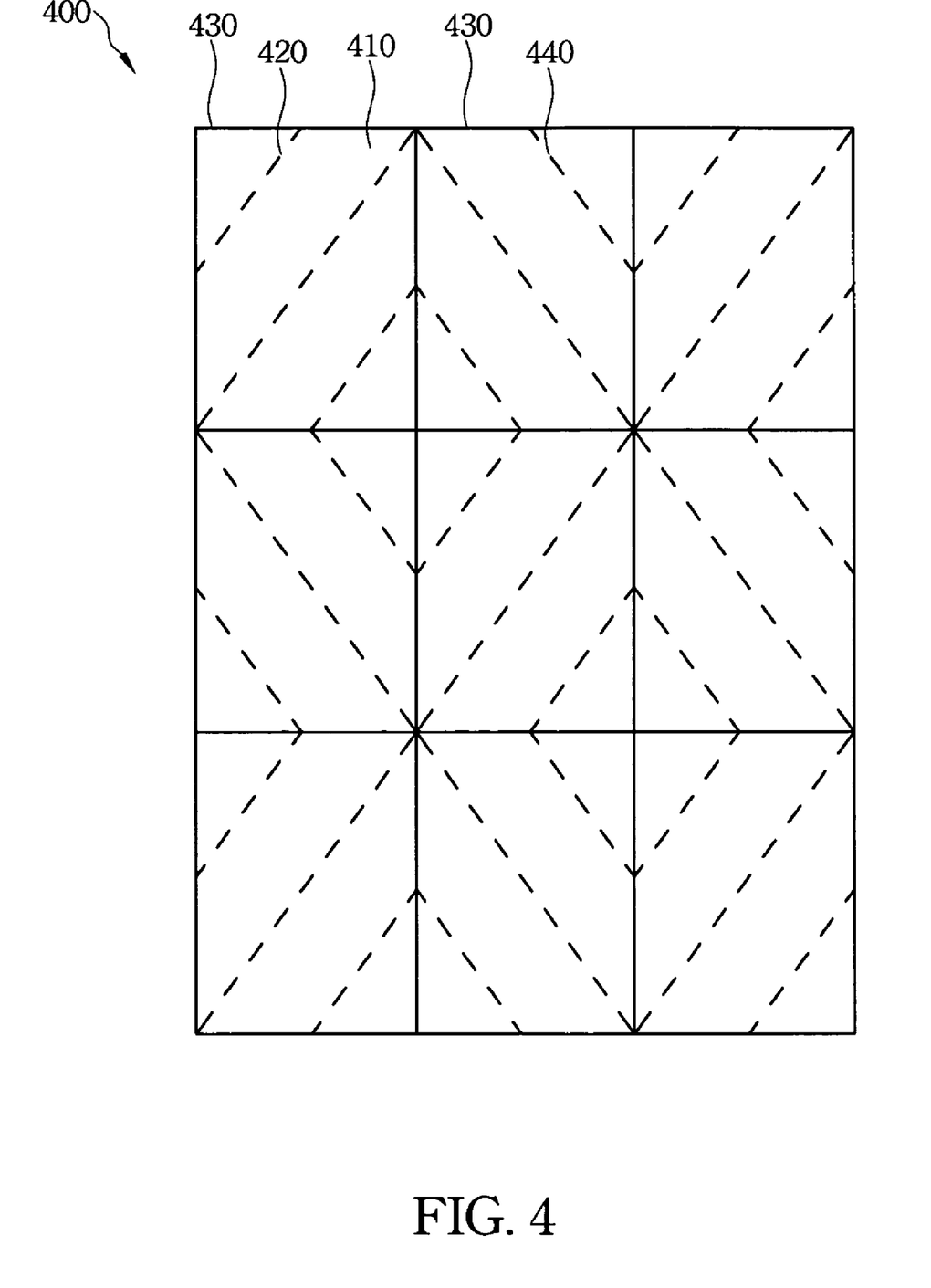
FIG. 4 shows a pixel layout of an LCD according to another embodiment of the present invention.

FIG. 4 shows a pixel layout of another LCD 400 according to another embodiment of the present invention illustrating six pixels thereof. In this embodiment, the first domain regulator includes a plurality of first slits 420 on the pixel electrodes 410, and a plurality of closed rectangular protrusions 430 around the first slits 420 on the second substrate. The second domain regulator includes a plurality of second slits 440 on the pixel electrodes and a plurality of closed rectangular protrusions 430 around the second slits 440 and on the second substrate. The first slits 420 extend in a direction different from the extending direction of the second slits 440.

Figure 5:
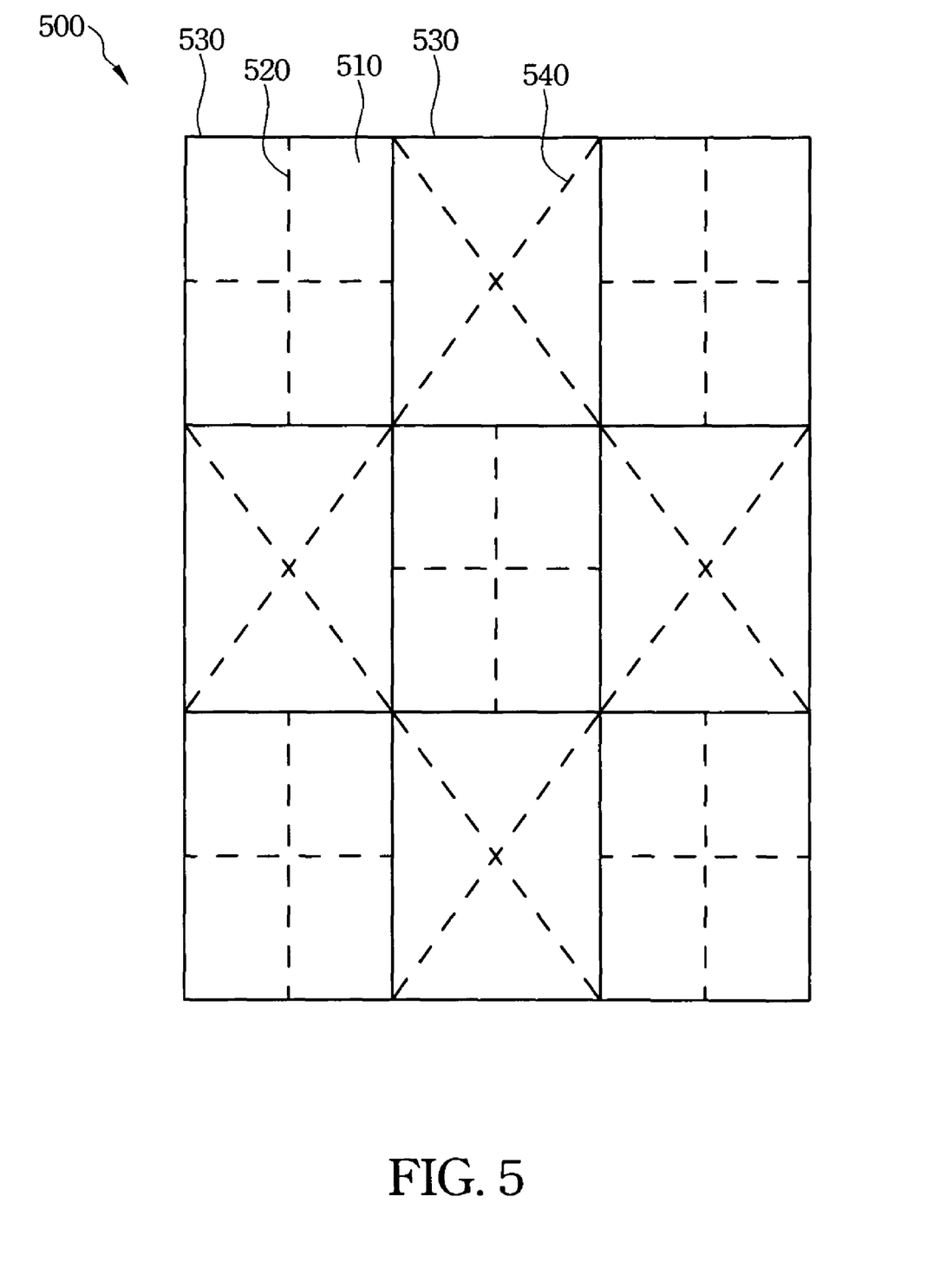
FIG. 5 shows a pixel layout of an LCD according to another embodiment of the present invention.

FIG. 5 shows a pixel layout of another LCD 500 according to another embodiment of the present invention illustrating six pixels thereof. In this embodiment, the first domain regulator includes a plurality of first slits 520 arranged in a cross-shaped pattern on the pixel electrodes 510, and a plurality of closed rectangular protrusions 530 around the first slits 520 on the second substrate. The second domain regulator includes a plurality of second slits 540 arranged in a X-shaped pattern on the pixel electrodes 510, and a plurality of closed rectangular protrusions 530 around the second slits 540 on the second substrate.

Figure 6:
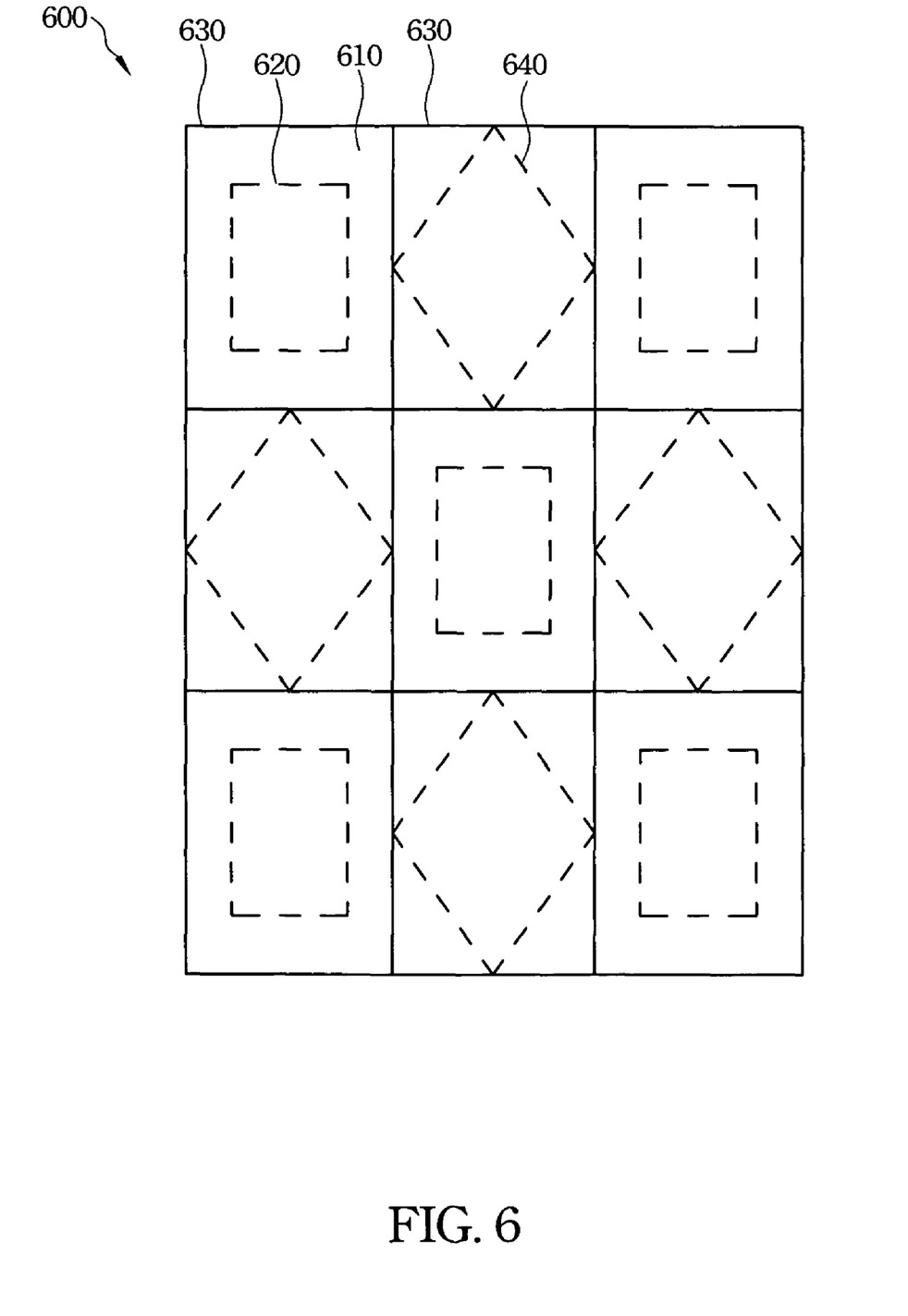
FIG. 6 shows a pixel layout of an LCD according to another embodiment of the present invention.

FIG. 6 shows a pixel layout of another LCD 600 according to another embodiment of the present invention illustrating six pixels thereof. In this embodiment, the first domain regulator includes a plurality of first slits 620 arranged in a rectangular pattern on the pixel electrodes 610, and a plurality of closed rectangular protrusions 630 around the first slits 620 on the second substrate. The second domain regulator includes a plurality of second slits 640 arranged in a diamond-shaped pattern on the pixel electrodes 610, and a plurality of closed rectangular protrusions 630 around the second slits 640 on the second substrate.

In the embodiments shown in FIGS. 3-6, the first domain regulator and the second domain regulator are respectively provided in two adjacent pixels. However, when the LCD of the present invention is designed to display a color image, the first domain regulator and the second domain regulator are preferably provided in two adjacent R pixels, two adjacent G pixels or two adjacent B pixels, respectively.

In a VA LCD according to another embodiment of the present invention, the first, second, third and fourth domain regulators are respectively provided in four adjacent pixels for regulating orientation of the liquid crystal layer such that the liquid crystal molecules are aligned obliquely when a voltage is applied, so that the orientation will include a plurality of first, second, third and fourth directions different from each other.

Figure 7A:
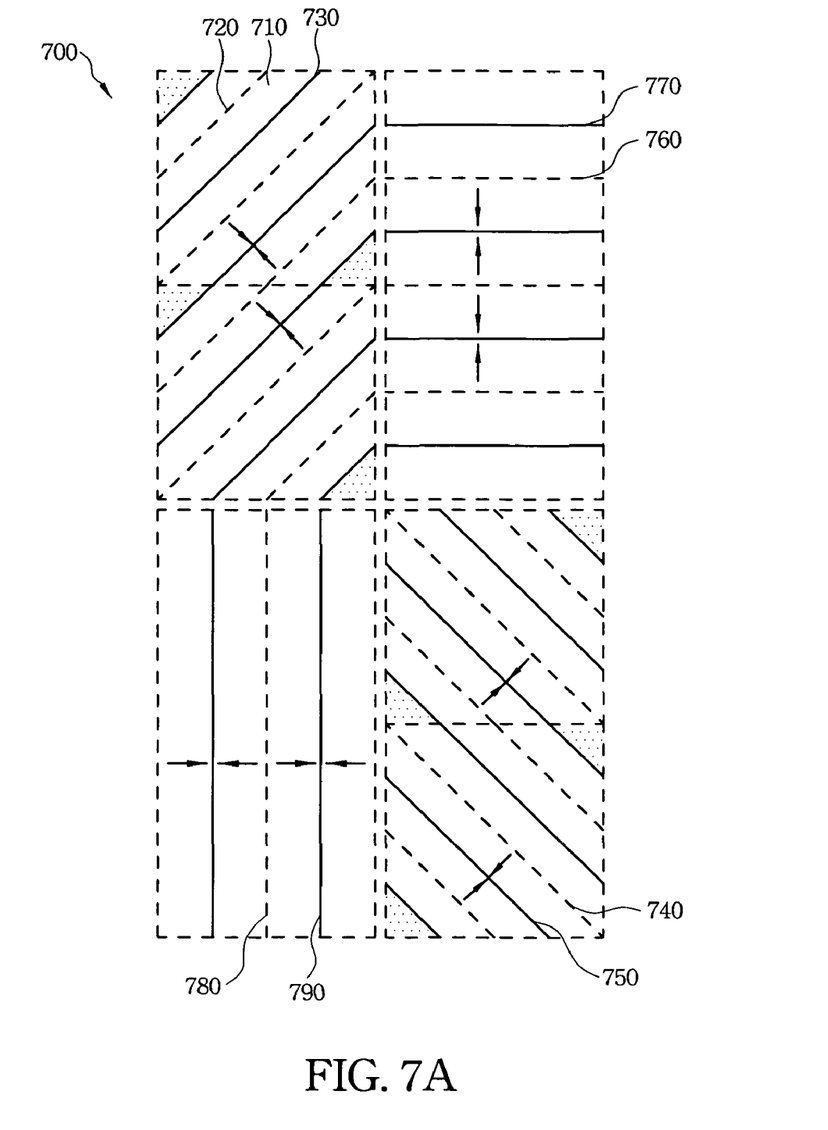
FIG. 7A shows a pixel layout of an LCD according to another embodiment of the present invention.

FIG. 7A shows a pixel layout of an LCD 700 according to another embodiment of the present invention illustrating four pixels thereof. In this embodiment, the first domain regulator includes a plurality of first slits 720 on the pixel electrodes 710, and a plurality of first protrusions 730 on the second substrate, wherein the first slits 720 and the first protrusions 730 are arranged alternately and in parallel to each other. The second domain regulator includes a plurality of second slits 740 on the pixel electrodes 710, and a plurality of second protrusions 750 on the second substrate, wherein the second slits 740 and the second protrusions 750 are arranged alternately and in parallel to each other. The first slits 720 and the first protrusions 730 extend in a first direction, and the second slits 740 and the second protrusions 750 extend in a second direction perpendicular to the first direction. The third domain regulator includes a plurality of third slits 760 on the pixel electrodes 710, and a plurality of third protrusions 770 on the second substrate, wherein the third slits 760 and the third protrusions 770 are arranged alternately and in parallel to each other. The fourth domain regulator includes a plurality of fourth slits 780 on the pixel electrodes 710, and a plurality of fourth protrusions 790 on the second substrate, wherein the fourth slits 780 and the fourth protrusions 790 are arranged alternately and in parallel to each other. The third slits 760 and the third protrusions 770 extend in a third direction, and the fourth slits 780 and the fourth protrusions 790 extend in a fourth direction perpendicular to the third direction. The angle included between the edge of the pixel electrode and the extending direction of the first and second protrusions 730, 750 is about 45 degrees, and the angle included between the edge of the pixel electrode and the extending direction of the third and fourth protrusions 770, 790 is about 90 degrees.

Figure 7B:
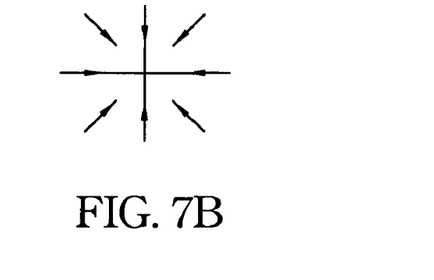
FIG. 7B illustrates the oblique directions of the liquid crystal molecules in the LCD of FIG. 7A.

It is understood that, although the orientation of the liquid crystal is divided into only two mutually different directions in each of the pixels (as indicated by the arrows shown in FIG. 7A), the oblique directions of the liquid crystal molecules in one pixel are different from those in adjacent pixels. Therefore, when an image or object is displayed by at least four adjacent pixels, the orientation of the liquid crystal can be regarded as including eight mutually different directions as indicated by the arrows shown in FIG. 7B, thereby obtaining an improved viewing angle performance as compared with the conventional LCD 100. Typically, an image is not so delicate that a large difference is observed between two adjacent pixels. Therefore, substantially no color-mixing problem or recognition-confusing problem is observed in the LCD of the present invention. The orientation of the liquid crystal in a single pixel of the LCD according to this embodiment is divided into only two mutually different directions such that, as compared with the conventional LCD 200, the total area of the darkened regions (which are hatched in FIG. 7A) is significantly reduced thereby increasing the aperture ratio.

In the embodiments shown in FIG. 7A, the first, second, third and fourth domain regulators are respectively provided in four adjacent pixels. However, when the LCD of the present invention is designed to display a color image, the first, second, third and fourth domain regulators are preferably provided in four adjacent R pixels, four adjacent G pixels or four adjacent B pixels, respectively.

Next, the process for forming the protrusions and slits will be described as follows. For forming the protrusions on the CF substrate, a photoresist is first coated on the surfaces thereof, a predetermined pattern (referring to the pattern shown in FIGS. 3-7) is then transferred thereon, and then the pattern is developed to form the protrusions. For forming the slits on the TFT substrate, pixel electrodes having the slit patterns shown in FIGS. 3-7 are formed in the pixel-electrode forming step of the TFT-substrate manufacturing process.

Through the specific arrangement of the domain regulators, the present invention can decrease the number of the oblique directions of the liquid crystal molecules in a single pixel to reduce the total area of the darkened regions, thereby increasing the aperture ratio. Meanwhile, an improved viewing angle performance is obtained by the different oblique directions provided by the liquid crystal molecules in the adjacent pixels. Therefore, an LCD utilizing the design of the present invention has an improved viewing angle performance and a high aperture ratio.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A liquid crystal display having a plurality of pixels arranged in a matrix, the liquid crystal display comprising:
   a first substrate and a second substrate treated by vertical alignment process, wherein the first substrate is provided with a plurality of pixel electrodes;
   a liquid crystal layer being sandwiched between the first and the second substrates, the liquid crystal layer including liquid crystal molecules aligning in a direction generally perpendicular to a principal surface of the first substrate when no substantial electric field is applied to the liquid crystal layer; and
   a first domain regulator provided in one of two adjacent pixels or two adjacent pixels representing the same color, and a second domain regulator in the other of the two adjacent pixels or the two adjacent pixels representing the same color, wherein the first domain regulator and the second domain regulators are used for regulating an orientation of the liquid crystal layer such that the liquid crystal molecules are aligned obliquely when a voltage is applied, so that the orientation of the liquid crystal layer includes a plurality of first and second directions wherein the first directions are different from the second directions; wherein the first domain regulator is selected from the group consisting of domain regulators (A), (C) and (E), and the second domain regulator is selected from the group consisting of domain regulators (B) and (D),
   the domain regulator (A) comprising:
      a plurality of slits arranged in a zigzag pattern on the pixel electrodes; and
      a plurality of protrusions on the second substrate, wherein the slits and the protrusions are arranged alternately and in parallel to each other;
   the domain regulator (B) comprising:
      a plurality of cross-shaped slits on the pixel electrodes; and
      a plurality of closed rectangular protrusions around the cross-shaped slits on the second substrate;
   the domain regulator (C) comprising:
      a plurality of slits arranged in a X-shaped pattern on the pixel electrodes; and
      a plurality of closed rectangular protrusions around the slits on the second substrate;
   the domain regulator (D) comprising:

a plurality of slits arranged in a rectangular pattern on the pixel electrodes; and a plurality of closed rectangular protrusions around the slits on the second substrate; and the domain regulator (E) comprising:

a plurality of slits arranged in a diamond-shaped pattern on the pixel electrodes; and a plurality of closed rectangular protrusions around the slits on the second substrate.

2. The liquid crystal display according to claim 1, wherein the first domain regulator is the domain regulator (A), and the second domain regulator is the domain regulator (B).

3. The liquid crystal display according to claim 1, the first domain regulator is the domain regulator (B), and the second domain regulator is the domain regulator (C).

4. The liquid crystal display according to claim 1, the first domain regulator is the domain regulator (D), and the second domain regulator is the domain regulator (E).

5. A liquid crystal display having a plurality of pixels arranged in a matrix, the liquid crystal display comprising:

a first substrate and a second substrate treated by vertical alignment process, wherein the first substrate is provided with a plurality of pixel electrodes;

a liquid crystal layer being sandwiched between the first and second substrates, the liquid crystal layer including liquid crystal molecules aligning in a direction generally perpendicular to a principal surface of the first substrate when no substantial electric field is applied to the liquid crystal layer; and a first domain regulator provided in one of four adjacent pixels or four adjacent pixels representing the same color, a second domain regulator in another one of the four adjacent pixels or the four two adjacent pixels representing the same color, a third domain regulator in another one of the four adjacent pixels or the four two adjacent pixels representing the same color, and a fourth domain regulator in another one of the four adjacent pixels or the four two adjacent pixels representing the same color, wherein the first domain regulator, the second domain regulator, the third domain regulator and the fourth domain regulator are used for regulating orientation of the liquid crystal layer such that the liquid crystal molecules are aligned obliquely when a voltage is applied, so that the orientation of the liquid crystal layer includes a plurality of first, second, third and fourth directions different from each other;

wherein, the first domain regulator comprising:
a plurality of first slits on the pixel electrodes; and
a plurality of first protrusions on the second substrate, wherein the first slits and the first protrusions are arranged alternately and in parallel to each other;

the second domain regulator comprising:
a plurality of second slits on the pixel electrodes; and
a plurality of second protrusions on the second substrate, wherein the second slits and the second protrusions are arranged alternately and in parallel to each other, and the first slits and the first protrusions extend in a first direction, and the second slits and the second protrusions extend in a second direction perpendicular to the first direction;

the third domain regulator comprising:
a plurality of third slits on the pixel electrodes; and
a plurality of third protrusions on the second substrate, wherein the third slits and the third protrusions are arranged alternately and in parallel to each other; and the fourth domain regulator comprising:
a plurality of fourth slits on the pixel electrodes; and
a plurality of fourth protrusions on the second substrate, wherein the fourth slits and the fourth protrusions are arranged alternately and in parallel to each other, and the third slits and the third protrusions extend in a third direction, and the fourth slits and the fourth protrusions extend in a fourth direction perpendicular to the third direction;

wherein an angle included between the edge of the pixel electrode and the extending direction of the first and second protrusions is 45 degrees, and an angle included between the edge of the pixel electrode and the extending direction of the third and fourth protrusions is 90 degrees.

* * * * *